Feb. 17, 1959 R. B. AUSTIN ET AL 2,873,866
MATERIAL HANDLING APPARATUS
Filed March 22, 1956 3 Sheets-Sheet 1
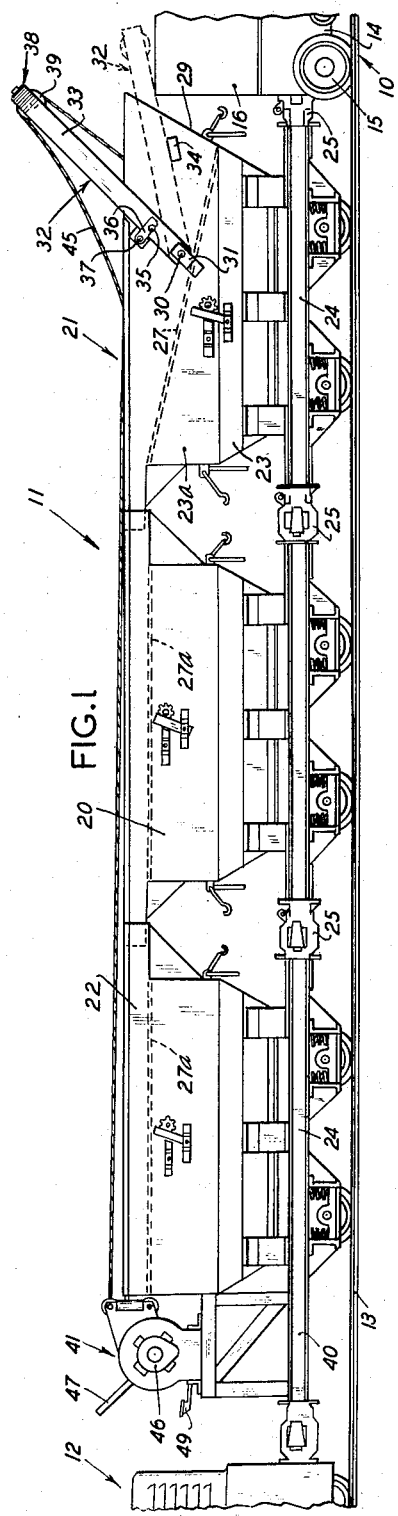
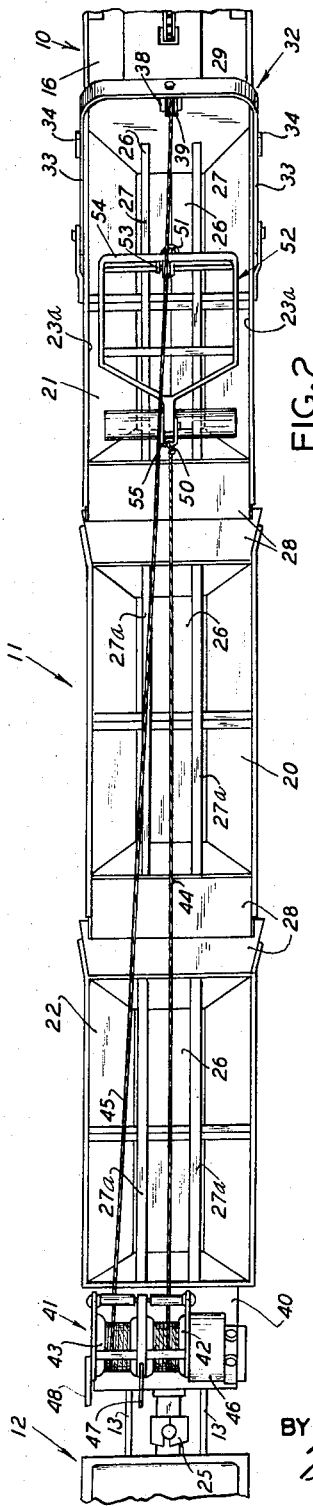
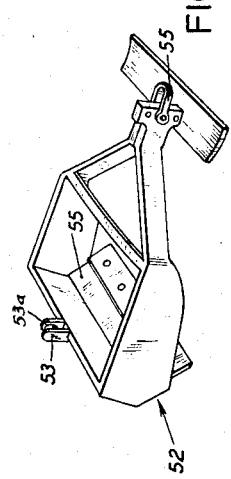
INVENTORS
ROBERT B. AUSTIN
ROGER V. PIERCE
JOHN S. WRIGHT
BY Feb. 17, 1959     R. B. AUSTIN ET AL     2,873,866
MATERIAL HANDLING APPARATUS
Filed March 22, 1956     3 Sheets-Sheet 2
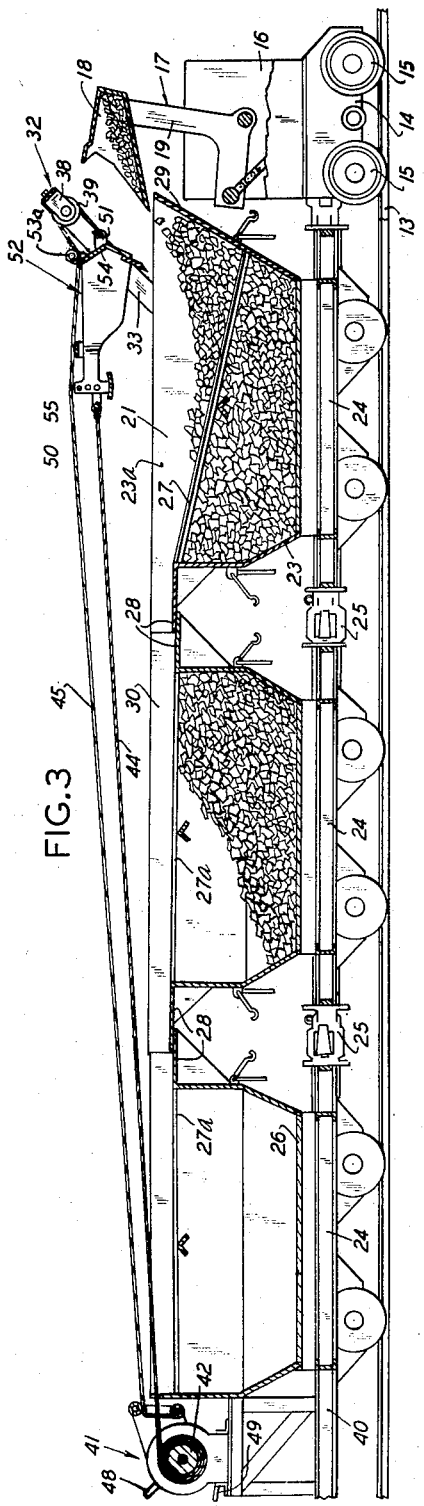
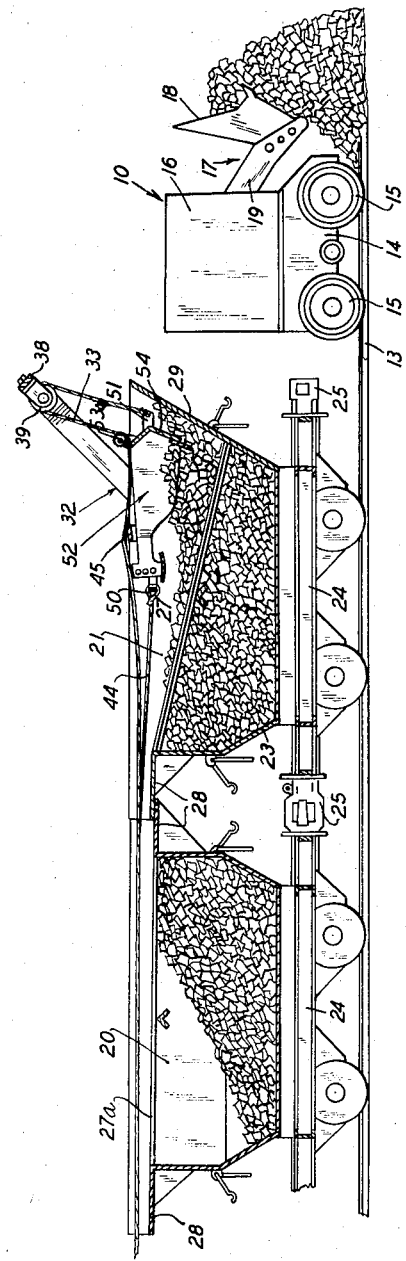
INVENTORS
ROBERT B. AUSTIN
ROGER V. PIERCE
JOHN S. WRIGHT
BY Feb. 17, 1959  R. B. AUSTIN ET AL  2,873,866
MATERIAL HANDLING APPARATUS
Filed March 22, 1956  3 Sheets-Sheet 3
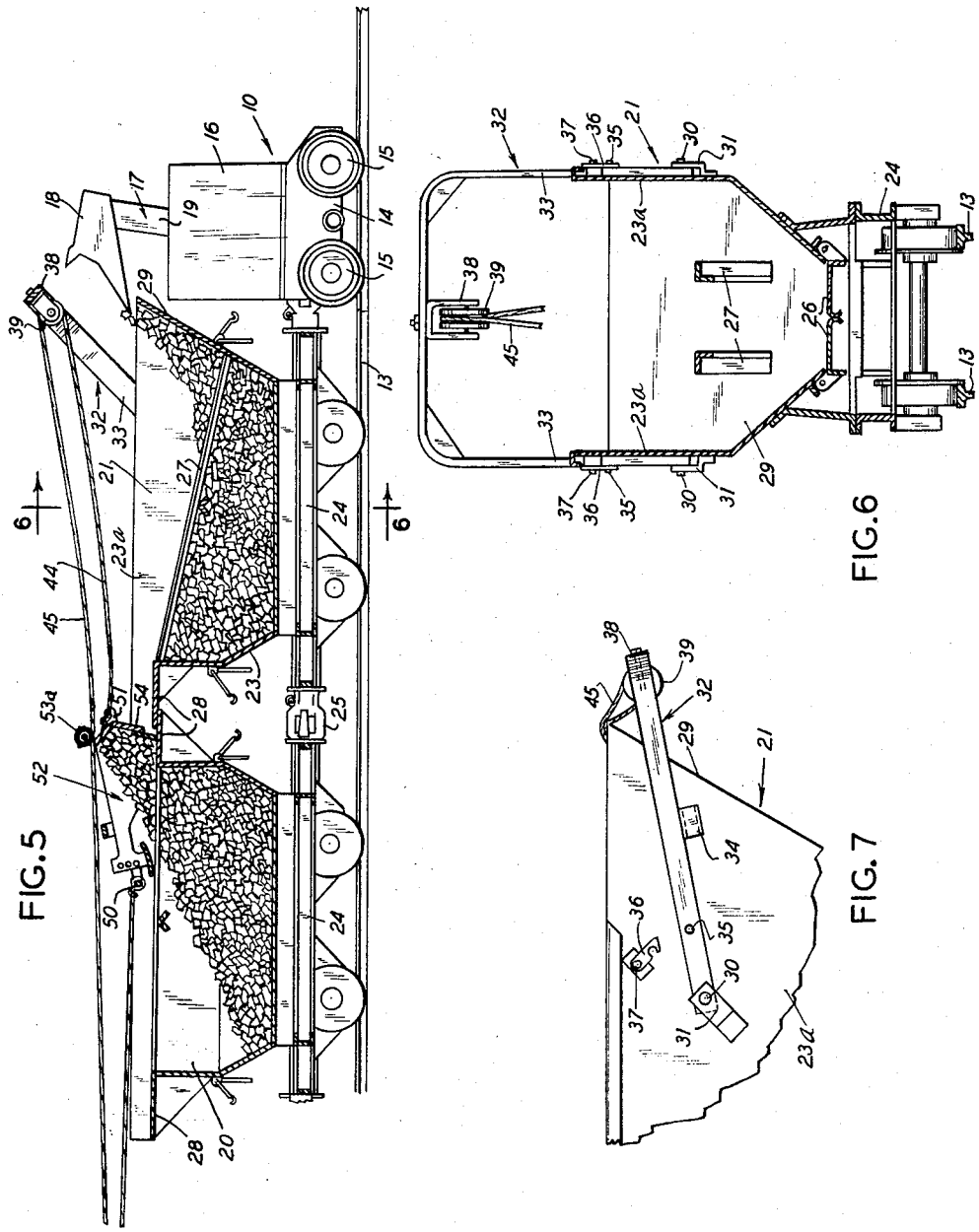
INVENTORS
ROBERT B. AUSTIN
ROGER V. PIERCE
JOHN S. WRIGHT
BY

United States Patent Office 2,873,866
Patented Feb. 17, 1959

2,873,866

MATERIAL HANDLING APPARATUS

Robert B. Austin, Wallace, Idaho, Roger V. Pierce, Salt Lake City, Utah, and John S. Wright, Montpelier, Idaho Application March 22, 1956, Serial No. 573,219

4 Claims. (Cl. 214—41)

This invention relates broadly to material handling apparatus, and more particularly but not exclusively to tunnel muck handling machinery for receiving, loading, and hauling loose material created while forming underground excavations such as in mining operations.

One of the greatest problems in driving tunnels, drifts, and haulage openings in mining operations has been to rapidly and efficiently remove the loose material or muck from the face of the drift or tunnel. It is presently common practice to employ a standard tunnel loading unit conventionally termed a "mucking machine" for placing the muck or loose material into the cars and as each successive car becomes filled, to switch it out and replace it with an empty car for subsequent filling.

Predominantly the tunnels or drifts are so narrow as to accommodate only a single pair of rails forming one trackway, and therefore it is necessary to remove the loaded cars to a point where a second trackway or a spur is available, and obviously much time is consumed in removing the loaded car and replacing an empty one, during which time the mucking machine remains idle.

Over a period of years, many schemes for the filling and transferring of cars have been experimented with such as automatic car transfers, special overhead monorail switching arrangements, etc., but in all cases time for setting up these various devices and the cutting of by-passes plus the actual time of transferring cars has rendered them costly and open to improvement.

Other attempts have been made to develop some type of conveying system with a capacity sufficient to hold an entire drift round in order that it would not be necessary to delay for switching several cars. Many structures have been attempted such as the construction of an overhead loading ramp with built-in bins which permitted a full train of cars to pass under the structure and be loaded at one time. Other attempts were made to use long ramps or belts under which a string of cars was spotted and loaded from the material placed upon the belt. In nearly all cases, the time necessary to move the machines from the face during blasting added to the time consumed in advancing the face of the drift and therefore they are not advantageous.

Prior to the general acceptance in mining circles of a wheel mounted, air, electric, or diesel operated, loader for drift mucking, there was a time when scraper hoists were popular for application in practically every type of underground work, and were being used with ramps of one kind and another in drift work. During this time, a multiple car scraper loading ramp was designed and built. In this structure, a scraper hoist pulled the muck up a slide and back over the plurality of cars. However, this was not acceptable due to the inability of the scraper to clean up, and too much time was lost in the cleanup operation. Time was consumed in setting up the scraper hoist and drag line and removing same for placing of empty cars and removing same respectively. Further, the entire assembly had to be removed from the blasting area and replaced afterward, consuming more time.

It is now well settled in mining operations that at a drift heading, mucking and cleanup is most economically and practically completed by the air or electric operated standard tunnel loading unit or mucking machine or one of a number of good loaders.

As recently as 1949, efforts have been made to combine the flexibility of the air operated loader and a scraper hoist to load a series of mine cars by employing a mucking machine to deposit the muck directly into a box type scraper having an open bottom and subsequently to draw the scraper over the open tops of the series of mine cars, thus enabling the muck in the box type scraper to be distributed successively into the cars. This is disclosed in United States Letters Patent No. 2,587,362 of February 26, 1952. However, there are deficiencies in this structure in that the loading unit or mucking machine must cease its operation while the box type scraper is being drawn over the series of cars, thus prolonging the time required to muck out a given round, and further, one car at the end of the train is limited strictly to loading the balance of the series of cars and is useless as a means of conveying material from the tunnel face.

The present invention seeks to overcome these several undesirable features by providing a material handling apparatus having a receiving car into which the loading unit or mucking machine may empty continuously without regard to the movement of the scraper, and the receiving car also constitutes a material hauling or conveying vehicle as part of the train of cars, thus providing a material handling unit which is capable of receiving and conveying a full round of muck from the face of a tunnel which precludes the necessity of switching and is completely self-contained to obviate the necessity for setting up and removing equipment and therefore reduces to a minimum the time required for mucking a round from the face of a tunnel, drift, or ore haulage opening.

It is to be understood that the term "muck" employed in this work is used in a generic sense as being any loose material to be removed from the face or head of a drift, whether that material be waste material or valuable minerals, and we do not wish to limit ourselves in any respect beyond the scope of the appended claims.

It is to be noted that the present invention, though not necessarily limited thereto, is most practical when applied to conventional bottom-dump ore cars which are shown in the accompanying drawings, submitted for the purpose of illustration and not for limitation, which reveal one form that the invention may assume in actual practice.

In these drawings wherein like numerals are employed to designate like parts:

Figure 1 is a side elevation of a complete tunnel mucking apparatus including an engine and a mucking machine at opposed ends in fragmentary disclosure;

Figure 2 is a plan view of the mucking apparatus shown in Figure 1;

Figure 3 is a vertical longitudinal cross sectional view of the mucking apparatus with the mucking machine shown discharging into the receiving car;

Figure 4 is a fragmentary vertical longitudinal cross section showing the scraper in the receiving car and at the start of its movement to transfer material from the receiving car to the next successive car;

Figure 5 is a view similar to Figure 4 and showing the scraper having advanced from the receiving car while the mucking machine is again discharging into the receiving car;

Figure 6 is a slightly enlarged vertical lateral cross section taken on the plane indicated by line 6—6 of Figure 5;

Figure 7 is an enlarged fragmentary side elevation showing the tail block yoke in the lowered inoperative position; and Figure 8 is a perspective view of the preferred scraper.

In the embodiment of the invention shown in the drawings, a conventional shovel loader or so-called mucking machine is generally designated by the numeral 10. At the opposed end of the train indicated in its entirety by the numeral 11, we disclose a locomotive of the conventional type and indicated by the numeral 12. The locomotives are conventionally powered by batteries, air, or diesel, and are employed for moving the train 11 to and from the positions for loading and dumping. A pair of spaced parallel rails 13 constitute a trackway upon which the train 11 moves as does also the mucking machine 10.

The mucking machine 10 may be one of a great number of preferably mobile loaders and may be generally similar to that disclosed in United States Letters Patent No. 2,201,671 of May 21, 1940, which comprises a self-propelled truck 14 having flanged wheels 15.

Swiveled on the truck to turn about a vertical axis is a frame 16 which carries a vertically swingable or overshot shovel mechanism 17 including a shovel 18 mounted on the rocking frame 19. The shovel 18 when in the lowered position at the front end of the truck 14 may dig into the rock pile while the machine 10 is stationary or during forward movement thereof, and when loaded may swing upwardly and rearwardly over the top of the loader when the mucking machine 10 is disposed adjacent to the train 11 to discharge its contents at an elevated position at the rear side of the mucking machine 10, as shown in Figures 3 and 5.

The shovel 18 may be oscillated about the vertical axis with the frame 16 to load the rock at either side of the trackway in a manner which is well known. Since the details of the mucking machine construction are not of consequence to this present invention, further description thereof is omitted as being unnecessary.

In actual practice, the train 11 is designed to hold the entire round of approximately 50 tons of muck. The train comprises 10 five ton capacity cars. The intermediate ones of the cars are designated by the numeral 20, and the front end receiving car is designated by the numeral 21 while the rear end scraper hoist support car is designated by the numeral 22.

For convenience of illustration, we have shown the train as having but one intermediate car, but it will be understood that any number of intermediate cars desired may be employed to increase or decrease the capacity of the complete train 11 to that required for removal of any specific round or quantity of muck. Obviously, other size cars may be employed if so desired, when the physical size of the tunnel will accommodate them.

Although there are various types of ore or muck handling cars, the best arrangement for facile handling of muck calls for the use of bottom-dump cars, and it will be noted that in Figure 6 of the drawing we have illustrated in a diagrammatic way a car of this type. It will be understood that side dump cars may be employed if found desirable and we do not wish to be limited to any specific type of car, but we desire to claim our invention broadly, limited only by the scope of the appended claims.

The receiving car 21 has an open top body 23 which is carried on the conventional truck and frame assembly 24 which includes couplers 25 adapted to releasably secure the several cars together. Each of the other cars 20 and 22 are also provided with conventional frames 24 carried by trucks adapted to roll on the trackway formed of spaced rails 13 and to be releasably united with successive other cars. They are each also provided with the downwardly swingable bottom closure 26 (Figure 6), thus forming the bottom-dump ore car.

The receiving car 21 has disposed therein a pair of laterally spaced parallel rails 27 which extend longitudinally of the car 21 at an upward incline from the forward or free end of the car to a point adjacent to its open top at the opposed or coupled end. These bars constitute a support means for the scraper and as a unit will be designated as a grizzly, and the bars will be collectively so described hereinafter. Material placed in the receiving car may fall through the grizzly and fill the body 23 thereof up to and above the inclined grizzly 27. The free or forward end of the receiving car 21 instead of being formed with the horizontally extending plates 28 apparent on the opposed end of receiving car 21, both ends of intermediate cars 20 and the forward end of the scraper hoist support car 22 and constituting overlapping portions; is provided with an angular lip or receiving extension 29 designed to reduce to a minimum the spilling of material out of the receiving car during operation of the apparatus.

The side walls 23a of the receiving car extend upwardly a short distance above the horizontal plane of the overlapping portions 28 and constitute guideways which, together with the upwardly extending portions 23a of the intermediate cars 20 and the hoist supporting car 22, extend the full length of the train 11. On the outer faces of the side walls 23a of the receiving car 21, we provide axially aligned journal pins 30 which are secured to the side walls 23a at their inner ends and are supported at their outer ends in brackets 31, welded or otherwise secured to the side walls 23a.

A yoke 32, having spaced parallel legs 33 and a cross bar 34 uniting said legs 33 at their outer or free ends, is disposed in straddling relationship to the receiving car 21 and has the inner or lower ends of the legs 33 journaled on the journal pins 30 for tilting movement in a vertical plane longitudinal of the train 11. Welded or otherwise secured to the side walls 23a of the receiving car 21 are blocks 34 which constitute stops and support the yoke 32 in its lowered or inoperative position shown in dotted lines of Figure 1 and full lines of Figure 7.

Spaced from the journal pins 30, each leg 33 is provided with an outwardly extending boss 35 adapted to cooperate with a hook or latch 36 pivotally connected at 37 to the outer face of each side wall 23a of the receiving car 23. The full line position of Figure 1 discloses that these elements 35—37 support the yoke 32 in its raised or operative position.

Substantially midway the length of the cross bar 34, we provide a tail block 38 which includes a rope pulley 39 journaled for rotation and supported on the yoke 32.

Each of the intermediate cars 20 has the horizontally extending overlapping portions 28 at substantially the same horizontal plane as the portion 28 of receiving car 23, and also has horizontally extending parallel rails 27a which are secured at the ends of the cars 20 at substantially the same level as the overlapping portions 28 and constitute horizontally disposed grizzlies coincident to the open top of each car.

The scraper hoist support car 22 is provided with a frame extension 40 upon which is supported a conventional double drum hoist generally designated 41. Double drum hoists are well known in the trade, and although there are many makes, it may be generally similar to that disclosed in United States Patent No. 1,740,707 of December 24, 1929. This hoist comprises relatively rotatable drums 42 and 43 on which cables or wire ropes 44 and 45 are respectively wound. The drums are driven by a motor 46 powered by air, electricity, or diesel fuel, and each drum has a transmission mechanism embodying a friction clutch control 47 and 48 and also other levers or controls as 49 located within easy reach of an operator standing at the rearward end of the scraper hoist support car 22.

The free ends of the cables 44 and 45 are attached at 50 and 51 to the opposite ends of the scraper 52, which is of the open front, top, and bottom type, conventionally termed a hoe-type scraper. We employ the term "hoe-type" in the appended claims to identify any scraper which may by its own movement pick up a load of muck from the receiving car 21 as opposed to that type of scraper which must be loaded by other means. The tail rope 45 extends from drum 43 forwardly through an eye 53 having a roller 53a journaled at the top and is guided midway the width of the rear scraper wall 54 and thence through the tail block 38 wherein it passes over and downwardly from the rope pulley 39 and secures at 51 to the scraper. The pull rope 44 extends from the drum 42 forwardly of the train and is secured as by clevice 55 to the scraper 52 at 50.

The specific cable reeving defined for the tail rope 45 is very important because the eye 53 stops sideslap of the cables when the scraper is traveling along the train, loaded or unloaded, and is the instrumental control in lifting the scraper to the position shown in Figure 3 to lift it back over the muck pile in the receiving car 21. This avoids spilling of the muck from the car by the rearwardly moving scraper and controls the drop position of the scraper so that it will not drop over the end of the receiving car.

In general, the manner of using the improved device will be clearly apparent from the description given.

The mucking machine 10 is operated by one operator to load the muck or loose material into the receiving car 21, regardless of the position of the scraper 52. That is, when the scraper is in the position shown in Figure 5 or at other locations intermediate the ends of the train 11, the shovel 18 may be positioned to discharge muck into the car. It also may discharge while the scraper is in either of the positions as shown in Figures 3 and 4 of the drawing. Therefore the mucking machine operator need not be concerned with the position of the scraper but may continue his operation independently thereof.

The train loading operator, who will stand at the end of the scraper hoist support car, will operate the hoist 41 to effect travel of the scraper 52 longitudinally of the train from one end to the other. When drum 43 is energized to wind in the tail rope 45, the scraper 52 is moved to the forward end of the train. Alternately rope 44 is wound in and the scraper is moved rearwardly of the train carrying a full scraper load or charge of muck which was previously deposited in the receiving car 21.

Inspection of Figure 2 will reveal that the scraper is sufficiently wide to be supported upon the grizzlies 27 and 27a, and the material conveyed by the scraper will thus drop through the grizzlies and into the cars successively until they are all full. When the cars become full of muck, the locomotive 12 removes them to the dump or ore bins while the miners are drilling for a new round of blasting, and after the blast has taken place and the foul air cleared from the tunnel, the empty train 11 is again returned with the mucking machine to muck out the round of loose material.

It is to be understood that a sufficient number of intermediate cars 20 will be employed to handle a full round of muck, thus eliminating the necessity of switching cars or trains into the face of the drift more than once for each round.

It will also be seen that a plural number of scrapers 52 may be secured to the pull rope 44 and the material may thus be moved rearwardly from one car to the next by successive movement, it being contemplated to add a number of scrapers as found desirable to accommodate this function, thus reducing the time required for movement of the material from one end of the train to the other by effecting a series of short, successive passes or movements of a plurality of scrapers rather than a single full length pass or movement of a single scraper.

Having thus described our invention, we claim:

1. The combination with spaced rails forming a trackway; a muck loading device movable on said rails, of a series of interconnected open top cars movable on said rails to and from said muck loading device and having a receiving car at one end to receive muck from said loading device; said receiving car having a grizzly extending at an upward incline from its free end upwardly to a point adjacent to its open mouth at its opposed end; each other said car having a grizzly extending horizontally adjacent to its open mouth; all of said grizzlies being coincident to the open top of their respective cars; a tailblock supported upon said receiving car; said tailblock being selectively movable from a raised operative position above said cars to a lowered inoperative position; a double drum powered hoist carried by the end said car opposed to said receiving car; a hoe-type scraper disposed to slide upon said grizzlies; pull and tail ropes attached to said scraper and each secured to one said drum; said tail rope being trained about said tail block, whereby manual operation of said hoist effects movement of said scraper back and forth from end to end of said series of cars to successively transfer muck from the receiving car to the other cars; and said tail block when in its operative position serving to support the scraper in a raised position so that muck may be admitted thereunder.

2. The combination with spaced rails forming a trackway; a muck loading device movable on said rails, of a series of interconnected open top cars movable on said rails to and from said muck loading device and having a receiving car at one end to receive muck from said loading device; a scraper; means carried by said cars for effecting a path of movement of said scraper back and forth into and out of said receiving car and over the tops of said open top cars; a powered hoist carried by the end said car opposed to said receiving car; pull and tail ropes attached to said scraper and each secured to said hoist; a tail block; and said tail rope being trained about said tail block; and means on said receiving car effective to dispose said tail block in an operative position above a plane coinciding with the top of said receiving car and alternately in a lowered inoperative position, said tail block when in its operative position serving to support the scraper in a raised position so that muck may be admitted thereunder, whereby operation of said hoist effects movement of said scraper back and forth from end to end of said series of cars to successively transfer muck from the receiving car to the other cars.

3. In a self-contained muck loading apparatus for underground excavations comprising a series of mine cars coupled together for movement in unison along a trackway laid along a tunnel floor; at one end of said series of cars a bottom-dump receiving car having an open top; a grizzly in said receiving car extending from one end thereof upwardly to substantially the level of the open top at the opposed end whereby material placed in the open top of the receiving car fills the car to and above said inclined grizzly; a cable operated scraper movable longitudinally of said apparatus on said grizzly; a tail block carrying a cable of said scraper; and means effective to dispose said tail block in an operative position above a plane coinciding with the top of said receiving car and alternately in a lowered inoperative position, said tail block when in its operative position serving to support the scraper in a raised position so that the scraper may be returned over the receiving cars spaced above the material admitted thereinto.

4. In a self-contained muck loading apparatus for underground excavations comprising a series of mine cars coupled together for movement in unison along a trackway laid along a tunnel floor; at one end of said series of cars a receiving car having an open top; a scraper; powered means carried by said series of mine cars for effecting movement of said scraper according to manual selection from end to end of said series of mine cars and serving to transfer material from said receiving car to the other said cars; and means carried by said series of mine cars and disposed in proximity to said receiving car and movable alternately between an operative positive above a plane coinciding with the top of said receiving car and a lowered inoperative position, said means when in its operative position serving to support the scrap in a raised position so that the scraper may be returned over the receiving car while spaced above the material therein.

References Cited in the file of this patent

UNITED STATES PATENTS

| | | | |
|---|---|---|---|
| 507,122 | Harrington | Oct. 24, | 1893 |
| 1,222,686 | Shanor | Apr. 17, | 1917 |
| 2,139,129 | McCarthy | Dec. 6, | 1938 |
| 2,587,362 | Miller | Feb. 26, | 1952 |
| 2,779,493 | Walters | Jan. 29, | 1957 |

FOREIGN PATENTS

| | | | |
|---|---|---|---|
| 560,114 | Germany | Sept. 28, | 1932 |
| 616,929 | Great Britain | Jan. 28, | 1949 |
| 617,531 | France | Feb. 21, | 1927 |
| 1,032,816 | France | Apr. 1, | 1953 |